United States Patent Office 3,429,686
Patented Feb. 25, 1969

3,429,686
METHOD OF PRECIPITATING CALCIUM SULFATE FROM AN ACIDULATED PHOSPHATE ROCK SLURRY
Simon Dingemans and Willem Slot, Geleen, Netherlands, assignors to Stamicarbon N.V., Heerlen, Netherlands
No Drawing. Filed Oct. 13, 1964, Ser. No. 403,634
Claims priority, application Netherlands, Oct. 15, 1963, 299,280
U.S. Cl. 71—39      4 Claims
Int. Cl. C05b *11/06*

ABSTRACT OF THE DISCLOSURE

A process for making fertilizers containing nitrogen and phosphate by acidulating natural phosphates with a nitric acid-containing acidulating agent to provide a calcium nitrate-containing product. This product is then reacted in a first zone with ammonium sulfate and/or potassium sulfate at a temperature ranging from about 15° C. up to about 60° C. with the simultaneous formation of gypsum. The mole ratio of soluble calcium nitrate to the sulfate in this first zone is maintained above 0.8:1. The resulting reaction product is kept in suspension in a second zone at a temperature of about 15° C. up to about 60° C. for a period of at least 10 minutes. Thereafter the suspension is filtered to remove the gypsum and the substantially gypsum-free filtrate is treated with ammonia and water is extracted to produce the fertilizer.

---

The present invention relates to a process for the preparation of fertilizers containing nitrogen and phosphate, by making products containing calcium nitrate produced by decomposition of phosphates react with a solution containing ammonium sulphate and/or potassium sulphate, with simultaneous formation of a gypsum precipitate, removing the precipitate, lowering the acidity of the mother liquor and further processing this liquor in the known way, with extraction of water and, if so desired, addition of other substances.

The decomposition products referred to above may be prepared for instance by reacting nitric acid, or a mixture of nitric acid and sulphuric acid and/or phosphoric acid, with natural phosphates.

To remove an amount of calcium from such decomposition products in the form of gypsum, it has already been proposed to effect the precipitation in two stages, which prevents loss of ammonium sulphate and/or potassium sulphate in the form of syngenite crystals in the gypsum precipitate. With the aid of a deficient amount of sulphate solution, about half of the calcium ions are precipitated in the first stage in the form of syngenite-free gypsum. Upon removal of this gypsum precipitate by filtration, a distinct excess of sulphate is added to the filtrate in the second stage to precipitate the remaining calcium ions. This precipitate, which contains a considerable amount of syngenite, is filtered off and recirculated to the first stage, while the filtrate is processed into a compound fertilizer.

An objection to this process is that two filtrations are needed instead of one, while, moreover, the crystalline structure of the precipitates calls for long filtration times.

The invention provides a process which does not possess these drawbacks while the gypsum precipitate separated off is likewise free of syngenite. The said process is characterized in that the decomposition product containing calcium nitrate and and the sulphate solution are mixed in a reaction zone in such a ratio that more than 0.8 mol of soluble calcium compound is present per mol of sulphate and in that the reaction product is kept in suspension in a secondary reaction zone for at least 10 minutes before the precipitate is separated from it.

In the case of shorter residence times in the secondary reaction zone, the crystallization process will not reach full equilibrium, which will result not only in longer filtration times, but also in undesired deposition of gypsum—the scaling effect—in the equipment following the secondary reaction zone.

By preference, the residence times in the reaction zone and the secondary reaction zone are adjusted to at least 5 and 15 minutes, respectively.

If the ratio between the decomposition product containing calcium nitrate and the sulphate solution is such that less than 0.8 mol of soluble calcium compound is present per mol of sulphate, ammonium sulphate and/or potassium sulphate will be lost in the form of syngenite crystals in the gypsum precipitate. By preference, a ratio between 1 and 1.1 is chosen, as the filtration time will then be the most favourable. Upon further processing of the filtrate an end product is obtained which is virtually free of calcium so that the phosphate contained in it is almost completely water-soluble. In that case, the filtrate may, if so desired, be mixed with a decomposition product containing calcium nitrate, or with other calcium-containing products, for the preparation of fertilizers having a low content of water-soluble phosphate.

The temperature at which the precipitation process is carried out is not taken too high to ensure that upon cooling minimum scaling will occur in the equipment following the secondary reaction zone. If the temperature is too low, more dilute solutions will have to be used, as otherwise undesired products will crystallize out. By preference, the precipitation process generally is carried out at a temperature between 15 and 60° C. and conveniently between 15–35° C. Optimum results are obtained at temperatures between 25 and 35° C. Fluctuations in the supply and/or the concentration of the sulphate solution and the decomposition product containing calcium nitrate may result in a longer average filtration time. If part of the gypsum suspension, preferably 1–1.5% is fed back to the sulphate solution, the adverse effect of these fluctuations on the filtration time will be considerably reduced.

The process according to the invention will now be elucidated by means of the following non-restricting examples.

EXAMPLE 1

635 kg./hour of phosphate rock containing 51%-w. of CaO and 37.4%-w. of $P_2O_5$ were decomposed with 1460 kg. of nitric acid of 55%-w. concentration. The resulting decomposition liquor was cooled, in consequence of which $Ca(NO_3)_2 \cdot 4H_2O$ crystallized out, which was removed from the liquor by centrifugation. 780 kg./hour of $Ca(NO_3)_2 \cdot 4H_2O$ crystals were separated from the decomposition liquor. After that, 825 kg. per hour of ammonium sulphate solution of 40%-w. concentration were added to the said liquor. Both liquids were simultaneously supplied to a reactor, in which they were properly mixed. The temperature in the reactor was approximately 33° C., and the residence time of the reaction mixture about 8 minutes. The resulting suspension was passed through a secondary reactor, in which the residence time was about 16 minutes and the temperature about 30° C. To prevent settling of the solid particles, the suspension was kept in motion by means of an agitator. After that, the suspension was filtered and the precipitate was washed out with water. 435 kg./hour of syngenite-free gypsum were separated off on a filter having an area of 1 m.². The filtrate was lowered in acidity with 60 kg./ hour of gaseous ammonia and, with simultaneous extraction of water processed into fertilizer granules. Upon coating of the granules an end product was obtained containing 22.5% by weight of nitrogen and 23.7% by weight of $P_2O_5$. The phosphate contained in it was 95% water-soluble. When this experiment was repeated without use being made of a secondary reactor, it was found that, calculated to the same amounts, a filter area of about 2.5 m.² was needed.

EXAMPLE 2

418 kg./hour of phosphate rock containing 51%-w. of CaO and 34%-w. of $P_2O_5$ were decomposed with 940 kg. of nitric acid of 55%-by-weight concentration.

Two thirds of the decomposition liquor was treated with 640 kg. per hour of ammonium sulphate solution in the same way as described in Example 1. The residence times in the reactor and the secondary reactor were 10 and 30 minutes, respectively. The temperatures in the reactor and the secondary reactor were about 34 and about 28° C., respectively.

440 kg./hour of syngenite-free gypsum were separated off on a filter having an area of about 1 m.². When the residence times in the reactor and the secondary reactor were reduced to 3 and 9 minutes, respectively, the filter area required to remove the same amount of gypsum appeared to be about 1.8 m.².

The filtrate was mixed with the remaining portion of the decomposition liquor and the acidity of the resulting mixture was lowered with 70 kg./hour of gaseous ammonia. After extraction of water, granulation, and coating, an end product was obtained containing 24.4% by weight of nitrogen and 14.2% by weight of $P_2O_5$, half of which could be dissolved in water.

EXAMPLE 3

380 kg./hour of phosphate rocking containing 51%-w. of CaO and 37%-w. of $P_2O_5$ were decomposed with 800 kg. of nitric acid of 55%-by-weight concentration.

610 kg./hour of syngenite-free gypsum were precipitated in the decomposition liquid with the aid of a sulphate solution consisting of 820 kg. of ammonium sulphate solution of 40%-by-weight concentration, 115 kg. of nitric acid of 55%-by-weight concentration, and 174 kg. of potassium sulphate. The residence times and the temperatures in the reactor and the secondary reactor were 8 and 17 minutes and 35 and 29° C., respectively.

The required filter area was 1.6 m.². When the residence time in the secondary reactor was reduced to 8 minutes, the filter area required to separate off the same amount of gypsum appeared to be about 2 m.². After lowering of the acidity with 51 kg./hour of gaseous ammonia, extraction of water, and coating, a fertilizer was obtained which contained 22.5%-w. of N, 14.2%-w. of $P_2O_5$ and 9.4%-w. of $K_2O$. The phosphate was 95% water-soluble.

EXAMPLE 4

418 kg./hour of phosphate rock containing 51%-w. of CaO and 34%-w. of $P_2O_5$ were decomposed with a mixture of 710 kg. of nitric acid of 55%-by-weight concentration and 174 kg. of sulphuric acid of 45%-by-weight concentration. The resulting suspension, in which part of the calcium had already precipitated in the form of gypsum, was supplied to a reactor simultaneously with 1020 kg. of ammonium sulphate solution of 40%-by-weight concentration. The residence time in the reactor was 7 minutes, while the temperature was 32° C. After that, the suspension was passed through a secondary reactor, in which the residence time was 15 minutes and the temperature 28° C. Filtration of the precipitate yielded 660 kg./hour of syngenite-free gypsum. The required filter area was 1.9 m.²; reduction of the residence times by half increased it to about 3 m.². After lowering of the acidity with 34 kg./hour of gaseous ammonia, extraction of water, and coating, an end product was obtained which contained 25%-w. of N and 17.8%-w. of $P_2O_5$. The phosphate contained in it was 95% water soluble.

We claim:

1. In a process for the preparation of a fertilizer containing nitrogen and phosphate in which a calcium nitrate-containing product produced by the decomposition of phosphates is reacted with a sulfate solution containing a member selected from the group consisting of ammonium sulfate, potassium sulfate and their mixtures, with the simultaneous formation of a gypsum precipitate in the resulting reaction product and in which the gypsum precipitate is removed and the acidity of the remaining mother liquor is lowered and thereafter subjected to extraction of water, the improvement comprising reacting said separated calcium nitrate-containing product with said sulfate solution in a first reaction zone maintained at a temperature ranging from about 15° C. up to 35° C., the mole ratio of soluble calcium nitrate to sulfate in said first zone being greater than 0.8:1 and maintaining said gypsum precipitate in the resulting reaction product from said first zone in suspension in a secondary reaction zone for a period of at least ten minutes before the separation of said gypsum therefrom, the temperature of said secondary reaction zone being maintained between about 15° C. to about 35° C.

2. The process as claimed in claim 1 wherein said calcium nitrate containing product is reacted with said sulfate solution in said first reaction zone for a period of at least five minutes and maintaining said gypsum precipitate in suspension in the resulting reaction product in said secondary reaction zone for at least 15 minutes.

3. The process as claimed in claim 1 wherein the mole ratio of soluble calcium nitrate to sulfate in said first zone is between 1–1.1:1.

4. The process as claimed in claim 1 wherein the temperature in said first and secondary reaction zones is maintained between 25° C. and 35° C.

References Cited

UNITED STATES PATENTS

| 2,783,140 | 2/1957 | Hignett et al. | 71—37 |
| 3,049,416 | 8/1962 | Brown et al. | 71—37 |
| 3,241,944 | 3/1966 | Takeda et al. | 71—40 X |

DONALL H. SYLVESTER, *Primary Examiner.*

R. D. BAJEFSKY, *Assistant Examiner.*

U.S. Cl. X.R.

71—37